United States Patent
Mitadera

(10) Patent No.: US 8,844,247 B2
(45) Date of Patent: Sep. 30, 2014

(54) STORAGE METHOD

(75) Inventor: Jun Mitadera, Kanagawa (JP)

(73) Assignee: Mitsubishi Gas Chemical Company, Inc., Tokyo (JP)

(*) Notice: Subject to any disclaimer, the term of this patent is extended or adjusted under 35 U.S.C. 154(b) by 642 days.

(21) Appl. No.: 13/201,942

(22) PCT Filed: Feb. 17, 2010

(86) PCT No.: PCT/JP2010/052305
§ 371 (c)(1),
(2), (4) Date: Oct. 4, 2011

(87) PCT Pub. No.: WO2010/095629
PCT Pub. Date: Aug. 26, 2010

(65) Prior Publication Data
US 2012/0017544 A1    Jan. 26, 2012

(30) Foreign Application Priority Data

Feb. 19, 2009   (JP) .................................. 2009-036818

(51) Int. Cl.
*B65B 55/08*     (2006.01)
(52) U.S. Cl.
USPC ........................................ 53/428; 53/111 R
(58) Field of Classification Search
USPC ....................... 53/428, 425, 111 R
See application file for complete search history.

(56) References Cited

U.S. PATENT DOCUMENTS

| | | | |
|---|---|---|---|
| 5,741,566 A * | 4/1998 | Hogstrom et al. | 428/35.2 |
| 6,346,200 B1 | 2/2002 | Rooney | |
| 6,601,732 B1 | 8/2003 | Rooney et al. | |
| 7,026,635 B2 * | 4/2006 | Rangwalla et al. | 250/492.3 |
| 2004/0241365 A1 | 12/2004 | Inoue et al. | |
| 2005/0164021 A1 | 7/2005 | Inoue et al. | |
| 2008/0115460 A1 * | 5/2008 | Ruid et al. | 53/428 |
| 2009/0239013 A1 * | 9/2009 | Otaki et al. | 428/36.6 |
| 2010/0162663 A1 * | 7/2010 | McGee et al. | 53/428 |
| 2010/0317514 A1 * | 12/2010 | Ohta et al. | 502/402 |
| 2011/0247304 A1 * | 10/2011 | Kaldenhoff et al. | 53/428 |
| 2012/0328685 A1 * | 12/2012 | Stutz et al. | 424/412 |

FOREIGN PATENT DOCUMENTS

| | | |
|---|---|---|
| EP | 1 489 021 A1 | 12/2004 |
| JP | 2004 331207 | 11/2004 |
| JP | 2008 001383 | 1/2008 |
| JP | 2008 081529 | 4/2008 |
| WO | 2004 000934 | 12/2003 |

OTHER PUBLICATIONS

Extended Search Report issued Jul. 5, 2013 in European Application No. 10743755.0.
International Search Report Issued Apr. 6, 2010 in PCT/JP10/052305 filed Feb. 17, 2010.

* cited by examiner

*Primary Examiner* — Christopher Harmon
(74) *Attorney, Agent, or Firm* — Oblon, Spivak, McClelland, Maier & Neustadt, L.L.P.

(57) ABSTRACT

A storage method of storing a package with its contents under irradiation of light. At least part of the package is made of polyamide (A) which is obtained by polycondensation of a diamine component comprising 70 mol % or more of m-xylylenediamine and a dicarboxylic acid component comprising 70 mol % or more of α,ω-linear aliphatic dicarboxylic acid having 4 to 20 carbon atoms. The oxygen transmission of the package including polyamide (A) is reduced by irradiation of light, to prevent the spoilage of the contents.

2 Claims, 2 Drawing Sheets

STORAGE METHOD

TECHNICAL FIELD

The present invention relates to a method of storing food, drink, chemicals, electronic parts, and other products.

BACKGROUND ART

To protect the contents for distribution, cold storage, treatment, such as heat treatment for sterilization, the packaging material used for packaging food and drink is required to have various functions, for example, high transparency for ensuring outside view of the contents, etc. in addition to mechanical properties, such as strength, resistance to cracking, and heat resistance. Recently, oxygen barrier properties for preventing oxygen from penetrating into the package to protect packaged foods from oxidation, carbon dioxide barrier properties, and barrier properties for preventing fragrance from escaping are also required.

Sheet and film made of polyolefin such as polyethylene and polypropylene, polyester such as polyethylene terephthalate (PET), or aliphatic polyamide such as nylon 6 have been widely used as the packaging material because of their easiness of handling and processing in addition to their excellent transparency and mechanical properties. However, in view of poor barrier properties against gaseous substance, such as oxygen, the packaged contents are easily spoiled by oxidation. Further, in view of easy transmission of flavor and carbon dioxide, the shelf life of the contents is unfavorably short.

A plastic container (bottle, etc.) mainly made of polyester such as polyethylene terephthalate has been widely used for storing tea, fruit juice, carbonated drink, etc. In the plastic bottles, small-sized plastic bottles have come to be dominantly used with years. Since the surface area per unit volume increases with decreasing size of the bottle, the shelf life of the contents packaged in a small-sized bottle is likely to become short. Recently, the application of the plastic container has been broadened, for example, by the sale of oxygen- and light-sensitive beer packaged in plastic bottle and the sale of hot tea packaged in plastic bottle. These new applications of plastic bottle require to still further improve the gas barrier properties.

To improve the barrier properties against gaseous substance, such as oxygen, it has been proposed to use film made of a combination of the thermoplastic resin mentioned above and a gas barrier resin, such as polyvinylidene chloride, ethylene-vinyl alcohol copolymer, and polyvinyl alcohol. Although a film laminated with polyvinylidene chloride shows good gas barrier properties independent of storage conditions, the combustion thereof produces dioxin, likely to cause environmental pollution. Ethylene-vinyl alcohol copolymer and polyvinyl alcohol are free from the environmental pollution. However, the gas barrier properties of a multi-layered film having a barrier layer made of these resins largely decrease when the contents with high water activity are stored, when the package is stored in atmosphere with high humidity, or when the package together with its contents are heat-treated for sterilization, although exhibiting good gas barrier properties in atmosphere with relatively low humidity.

A xylylene-containing polyamide obtained by the polycondensation of xylylenediamine and aliphatic dicarboxylic acid, particularly, polyamide MXD6 obtained from m-xylylenediamine and adipic acid has high barrier properties against gaseous substance, such as oxygen and carbon dioxide. As compared with ethylene-vinyl alcohol copolymer and polyvinyl alcohol mentioned above, polyamide MXD6 is superior in the gas barrier properties at high humidity, but slightly inferior in the gas barrier properties at moderate or low humidity.

A resin having function of capturing oxygen in a container while preventing outside oxygen from entering into the container has been developed and applied to a multi-layered bottle. In view of oxygen absorption speed, transparency, strength, and processability, a multi-layered bottle having a gas barrier layer made of polyamide MXD6 which is blended with a transition metal catalyst has been proposed as the oxygen-capturing bottle. However, the blended transition metal promotes the oxidative decomposition of polyamide MXD6 to reduce the strength of resin.

As an oxygen-capturing technique without using transition metal, an oxygen absorption method has been proposed (Patent Documents 1 and 2), which utilizes the oxidation of a reduced product of a reducible organic compound by oxygen. According to Patent Documents, the oxygen barrier properties are surely improved at room temperature and at low humidity. However, the proposed method requires an additional process of reducing the reducible organic compound, and therefore, the reduction in costs is desired.

Patent Document 1: JP Patent 2922306
Patent Document 2: JP 2001-514131T

DISCLOSURE OF INVENTION

An object of the present invention is to solve the above problems and provide a storage method capable of easily enhancing the gas barrier properties of package.

As a result of extensive research, the inventor has found that the gas barrier properties of the package comprising a polyamide resin having a specific unit composition is improved by the irradiation of light. The invention is based on this finding.

Namely, the present invention relates to a storage method comprising: placing a product to be stored in a package and storing the package containing the product under irradiation of light, at least part of the package comprising polyamide (A) which is obtained by polycondensation of a diamine component comprising 70 mol % or more of m-xylylenediamine and a dicarboxylic acid component comprising 70 mol % or more of $\alpha,\omega$-linear aliphatic dicarboxylic acid having 4 to 20 carbon atoms.

According to the present invention, the gas barrier properties of package are improved by a simple and easy manner and the packaged contents are effectively protected from spoilage. Therefore, the present invention is of grate industrial value.

BEST MODE FOR CARRYING OUT THE INVENTION

Figure 1:
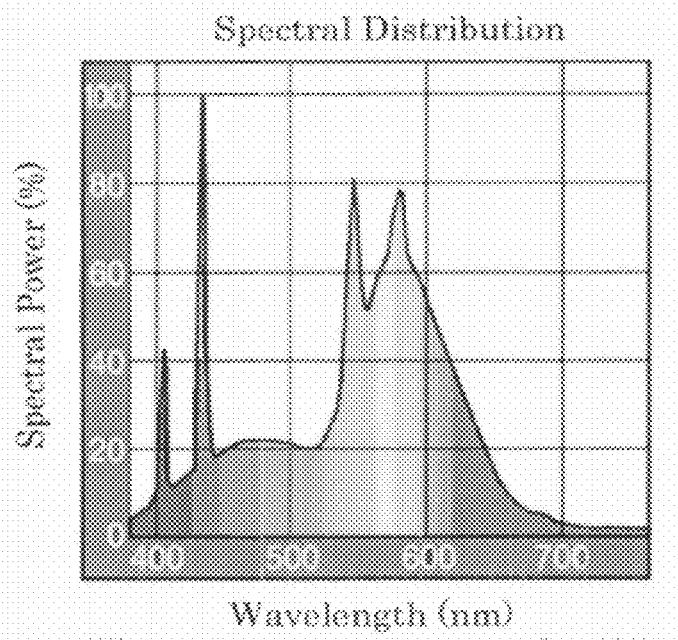
FIG. 1 shows a spectral distribution curve of light source A used in the example.

At least part of the package used in the invention is made of polyamide (A) which is obtained by the polycondensation of a diamine component comprising 70 mol % or more of m-xylylenediamine and a dicarboxylic acid component comprising 70 mol % or more of α,ω-linear aliphatic dicarboxylic acid having 4 to 20 carbon atoms.

The polyamide (A) has high gas barrier properties and good heat resistance and processability. The diamine component of polyamide (A) comprises 70 mol % or more, preferably 75 mol % or more, and more preferably 80 mol % or more (each inclusive of 100%) of m-xylylenediamine. The dicarboxylic acid component comprises 70 mol % or more, preferably 75 mol % or more, more preferably 80 mol % or more, and still more preferably 90 mol % or more (each inclusive of 100%) of α,ω-linear aliphatic dicarboxylic acid having 4 to 20 carbon atoms.

Examples of other diamines usable in combination with m-xylylenediamine include an aliphatic diamine, such as tetramethylenediamine, pentamethylenediamine, 2-methylpentanediamine, hexamethylenediamine, heptamethylenediamine, octamethylenediamine, nonamethylenediamine, decamethylenediamine, dodecamethylenediamine, 2,2,4-trimethylhexamethylenediamine, and 2,4,4-trimethylhexamethylenediamine; an alicyclic diamine, such as 1,3-bis(aminomethyl)cyclohexane, 1,4-bis(aminomethyl)cyclohexane, 1,3-diaminocyclohexane, 1,4-diaminocyclohexane, bis(4-aminocyclohexyl)methane, 2,2-bis(4-aminocyclohexyl)propane, bis(aminomethyl)decalin, and bis(aminomethyl)tricyclodecane; and an aromatic ring-containing diamine, such as bis(4-aminophenyl)ether, p-phenylenediamine, p-xylylenediamine, and bis(aminomethyl)naphthalene.

Examples of the α,ω-linear aliphatic dicarboxylic acid having 4 to 20 carbon atoms include an aliphatic dicarboxylic acid, such as succinic acid, glutaric acid, pimelic acid, suberic acid, azelaic acid, adipic acid, sebacic acid, undecanedioic acid, and dodecanedioic acid, with adipic acid and sebacic acid being preferred. Examples of other dicarboxylic acids usable in combination with the α,ω-linear aliphatic dicarboxylic acid having 4 to 20 carbon atoms include an aromatic dicarboxylic acid, such as terephthalic acid, isophthalic acid, and 2.6-naphthalenedicarboxylic acid. The dicarboxylic acid component may contain isophthalic acid in an amount of preferably 1 to 20 mol % and more preferably 3 to 10 mol %. When the dicarboxylic acid component contains isophthalic acid, whitening just after processing can be prevented more effectively.

The production method of the polyamide (A) is not particularly limited, and it can be produced by a known method under known polymerization conditions.

A small amount of monoamine or monocarboxylic acid may be added as a molecular weight modifier during the polycondensation for producing the polyamide. Polyamide (A) is produced, for example, by heating a nylon salt of m-xylylenediamine and adipic acid in the presence of water under pressure and allowing the polymerization to proceed in a molten state while removing the water added and the water eliminated by condensation. Alternatively, polyamide (A) can be produced by adding m-xylylenediamine directly into molten adipic acid and allowing the polycondensation to proceed under atmospheric pressure. In this method, the polycondensation is allowed to proceed by continuously adding m-xylylenediamine to adipic acid so as to maintain the reaction system in uniform liquid state and heating the reaction system during the addition so as to prevent the reaction temperature from being lower than the melting points of oligoamide and polyamide being formed.

Polyamide (A) produced by the melt polymerization may be further subjected to a solid-state polymerization. The method of solid-state polymerization of polyamide (A) is not particularly limited and may be conducted by a known method under known polymerization conditions.

The number average molecular weight of polyamide (A) is preferably 18000 to 43500 and more preferably 20000 to 30000. Within the above ranges, the heat resistance and processability are good.

The relative viscosity of polyamide (A) is preferably 1.8 to 3.9, more preferably 2.4 to 3.7, and still more preferably 2.5 to 3.7. Within the range of 1.8 to 3.9, the neck-in little occurs in the extrusion forming, thereby making it easy to tenter the extruded film or sheet and control the size of width.

The relative viscosity referred to herein is a ratio represented by the following formula:

$$\text{Relative viscosity} = (t)/(t_0)$$

wherein t is a dropping time of a solution of 1 g of polyamide (A) in 100 cc (1 dL) of 96% sulfuring acid measured at 25° C. using Cannon-Fenske viscometer, and $t_0$ is a dropping time of 96% sulfuring acid measured in the same manner.

Polyamide (A) may be included with an additive, such as an impact strength modifier, for example, various types of elastomers, a nucleating agent, a lubricant of a type of fatty acid amide or metal salt of fatty acid, a copper compound, an organic or inorganic halogen compound, an oxidant, for example, hindered phenol compound, hindered amine compound, hydrazine compound, sulfur compound, and phosphorus compound such as sodium hypophosphite, potassium hypophosphite, calcium hypophosphite and magnesium hypophosphite, a heat stabilizer, an anti-discoloration agent, an ultraviolet absorber, for example, benzotriazole compound, a mold release agent, a plasticizer, a colorant, flame retardant, and an alkali compound for preventing the gelation of polyamide resin.

In the present invention, the oxygen barrier properties of the package at least part of which comprises polyamide (A) is improved by the irradiation of light. Namely, by placing a product to be stored into a package and then irradiating the package with light, the oxygen barrier properties of the package increases to prevent the quality of the packaged product from deteriorating by oxidation. The wavelength of light for irradiation is preferably 10 to 1000 nm, more preferably 200 to 800 nm, and still more preferably 400 to 750 nm. In addition, the spectral distribution curve of the light for irradiation preferably has a peak at 600 nm or less, for example, at 405 nm, 436 nm, 546 nm, 578 nm, 589 nm, 450 nm, 538 nm, or 583 nm.

The illuminance on the package surface is preferably 100 to 10000 lux, more preferably 1000 to 10000 lux, and still more preferably 3000 to 10000 lux.

The temperature during the irradiation of light is preferably 0 to 60° C., more preferably 5 to 50° C., and still more preferably 10 to 40° C. Within the above ranges, the oxygen transmission of the container is easily reduced, i.e., the oxygen barrier properties are improved easily by the irradiation of light. The irradiation time may be determined according to the recommended storage time of the contents by a known storage method.

The degree of improving the oxygen barrier properties varies depending upon the content of polyamide (A) in the package and the illuminance of light. In view of improving the oxygen barrier properties, the content of polyamide (A) is preferably 0.1 to 100% by weight and more preferably 1 to 100% by weight. When another resin is blended with polyamide (A), the content of polyamide (A) in the package is preferably 1 to 50% by weight and more preferably 2 to 10% by weight. The average thickness of the package is preferably 10 to 3000 μm. The average thickness of the layer containing polyamide (A) is preferably 1 to 400 μm and more preferably 5 to 400 μm. When the package mentioned above is irradiated with light with a wavelength of 10 to 1000 nm at an illuminance of 100 to 10000 lux, the oxygen transmission after 24-h irradiation reduces preferably to 1 to 75% and more preferably to 1 to 70% of that before irradiation.

The package may be a known storage container hitherto used, such as a bag of multi-layered film, a bag of multi-layered sheet, a multi-layered bottle, a multi-layered blown bottle, a bag of single-layered film, and a single-layered bottle. For example, a single-layered film of polyamide (A) practically not stretched or a multi-layered film practically not stretched having at least one layer of polyamide (A) can be formed into various types of packages, for example, a bag-shaped container, such as four-side-sealed bag, pillow bags of various types, and standing pouches, caps for containers, etc. by a known production method under known production conditions.

A monoaxially or biaxially stretched film of a raw multi-layered film having at least one polyamide (A) layer may be formed into a container. Also, a multi-layered non-stretched film may be thermo-formed in to a cup container. Further, a laminate of a polyamide (A) film and paper may be formed into a multi-layered container. These containers may be produced by a known production method under known production conditions.

Examples of the resins for constituting the layer other than the polyamide (A) layer of a multi-layered container include low density polyethylene, high density polyethylene, linear low density polyethylene, polypropylene, ethylene-vinyl acetate copolymer, polystyrene, polyester, such as polyethylene terephthalate, modified polyolefin, and polyamide other than polyamide (A). These resins may be used alone or in combination of two or more.

Various products may be placed in the package and stored therein. Examples thereof include various products, for example, liquid drink, liquid, powdery or paste seasoning, paste food, liquid food, fresh noodle, boiled noodle, grain, processed food of grain, milk product, solid or liquid chemicals, liquid or paste medicine, cosmetics, and electronic parts.

A multi-layered container is preferably used when a product with high water activity is stored, when the package is exposed to high humidity during storage, and when the package is heat-treated for sterilization, such as retorting and boiling.

EXAMPLES

The present invention will be described in more detail with reference to the examples and comparative examples. However, it should be noted that the scope of the invention is not limited to the following examples. The oxygen transmission of the package (bottle and film) was measured by the following method.

(1) Oxygen Transmission of Film

Each film before or after irradiation of light was measured for its oxygen transmission ($cc/m^2 \cdot day \cdot atm$) in an atmosphere of 60% RH (relative humidity) according to ASTM D3985 using OX-TRAN 2/21 manufactured by Modern Controls, Inc. The gas barrier properties are better with decreasing measured value. The oxygen transmission after irradiation was measured 24 h after starting the irradiation at temperature described in each example. The oxygen transmission was also measured at 23° C. while shielding the film from light.

(2) Oxygen Transmission of Bottle

Each bottle before or after irradiation of light was measured for its oxygen transmission ($cc/bottle \cdot day \cdot 0.21$ atm) in an atmosphere of 100% RH inside the bottle and a surrounding atmosphere of 50% RH according to ASTM D3985 using OX-TRAN 2/61 manufactured by Modern Controls, Inc. The gas barrier properties are better with decreasing measured value. The oxygen transmission after irradiation was measured 24 h after starting the irradiation at temperature described in each example. The oxygen transmission was also measured at 23° C. while shielding the bottle from light.

The following light sources were used in the examples.

Light source A: Linear fluorescent lamp (Model FL40S•WW) manufactured by Panasonic. The spectral distribution curve thereof is shown in FIG. 1.

Figure 2:
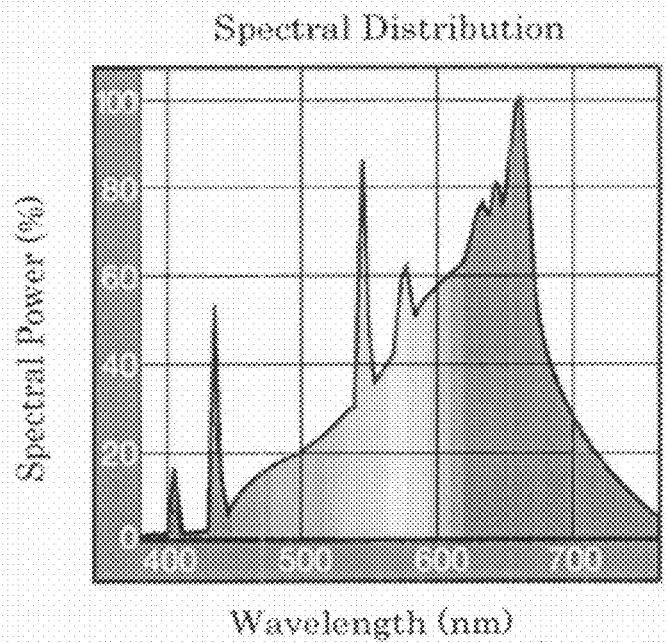
FIG. 2 shows a spectral distribution curve of light source B used in the example.

Light source B: High CRI fluorescent lamp (Model FL40S•L-EDL) manufactured by Panasonic. The spectral distribution curve thereof is shown in FIG. 2.

Figure 3:
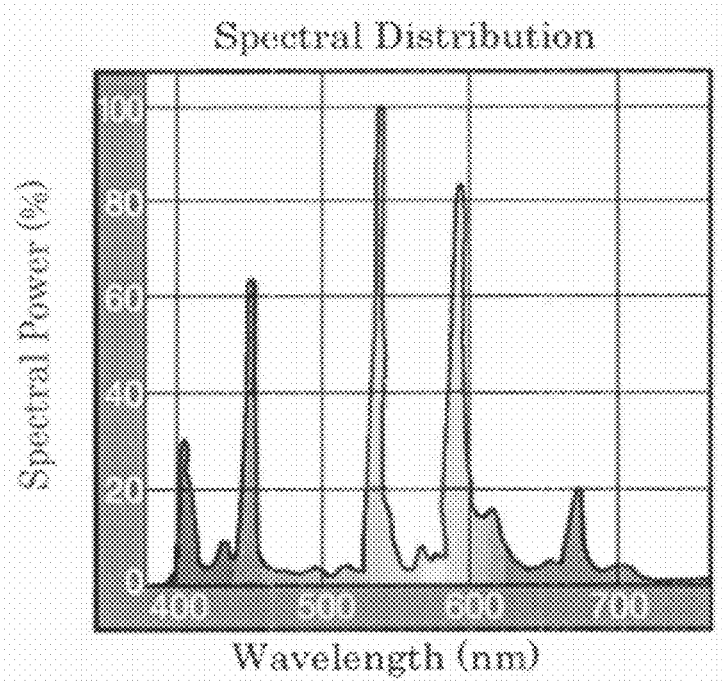
FIG. 3 shows a spectral distribution curve of light source C used in the example.

Light source C: Multi halogen lamp (Model MF100•L/BU) manufactured by Panasonic. The spectral distribution curve thereof is shown in FIG. 3.

Figure 4:
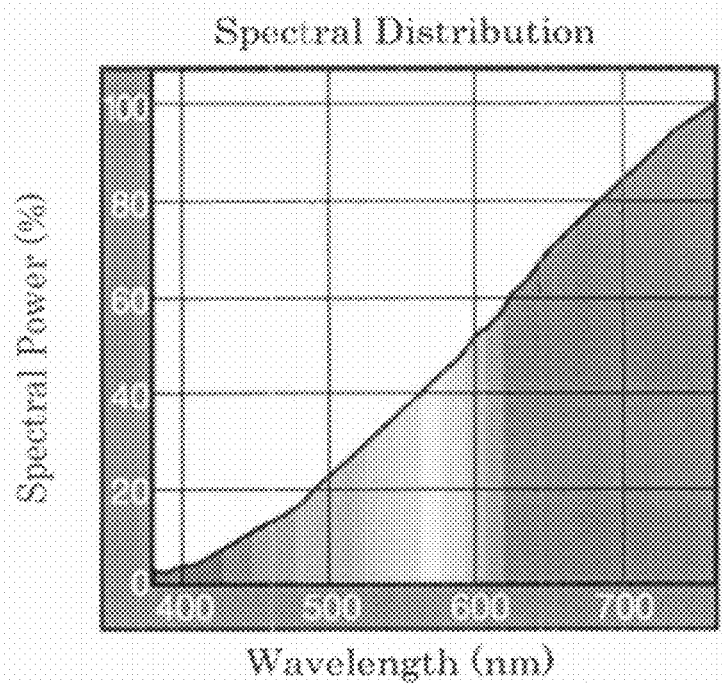
FIG. 4 shows a spectral distribution curve of light source D used in the example.

Light source D: Long life silica bulb (Model LW100V54WL) manufactured by Panasonic. The spectral distribution curve thereof is shown in FIG. 4.

Each spectral distribution curve is catalog data offered by Panasonic.

Example 1

A three-layered preform (26 g) of polyester layer/polyamide layer/polyester layer was produced by injection molding using poly-m-xylylene adipamide (MXD6, MX Nylon S6007 manufactured by Mitsubishi Gas Chemical Company, Inc.) as polyamide (A). After cooling, the preform was blow-molded while biaxially stretching under heating, to obtain a multi-layered bottle. The polyester layers were formed from polyethylene terephthalate (1101 manufactured by Invista) having an intrinsic viscosity of 0.80 (measured by using a mixed solvent, phenol/tetrachloroethane=6/4 by weight, at 30° C.). The content of polyamide (A) in the multi-layered bottle was 6% by weight. The average thickness of polyester layer/polyamide layer/polyester layer at the barrel portion of the multi-layered bottle was 150 μm/30 μm/150 μm.

The oxygen transmission of the obtained multi-layered bottle measured by shielding the bottle from light was 0.012 cc/bottle·day·0.21 atm The obtained multi-layered bottle was measured for the oxygen transmission under irradiation of light at 200 lux (light source A). The oxygen transmission was reduced to 0.008 cc/bottle·day·0.21 atm, showing good gas barrier properties. The measuring temperature was 23° C. The results are shown in Table 1 (the same applies below).

Example 2

A multi-layered bottle produced in the same manner as in Example 1 was measured for the oxygen transmission in the same manner as in Example 1 except for irradiating light at 3000 lux (light source A). The oxygen transmission was reduced to 0.005 cc/bottle·day·0.21 atm, showing good gas barrier properties. The measuring temperature was 23° C. The content of polyamide (A) in the multi-layered bottle was 6% by weight.

Example 3

A multi-layered bottle produced in the same manner as in Example 1 was measured for the oxygen transmission in the same manner as in Example 1 except for irradiating light at 5000 lux (light source B). The oxygen transmission was reduced to 0.004 cc/bottle·day·0.21 atm, showing good gas barrier properties. The measuring temperature was 23° C. The content of polyamide (A) in the multi-layered bottle was 6% by weight.

Example 4

A multi-layered bottle produced in the same manner as in Example 1 was measured for the oxygen transmission in the same manner as in Example 1 except for irradiating light at 8000 lux (light source C). The oxygen transmission was reduced to 0.003 cc/bottle·day·0.21 atm, showing good gas barrier properties. The measuring temperature was 23° C. The content of polyamide (A) in the multi-layered bottle was 8% by weight.

Example 5

A dry blend of 5% by weight of poly-m-xylylene adipamide (MX Nylon S6007 manufactured by Mitsubishi Gas Chemical Company, Inc.) as polyamide (A) and 95% by weight of polyethylene terephthalate (1101 manufactured by Invista) was injection-molded into a single-layered preform (26 g). After cooling, the preform was blow-molded while biaxially stretching under heating, to obtain a single-layered bottle. The average thickness at the barrel portion of the bottle was 300 μm.

The oxygen transmission of the obtained single-layered bottle measured by shielding the bottle from light was 0.035 cc/bottle·day·0.21 atm.

The obtained bottle was measured for the oxygen transmission under irradiation of light at 2000 lux (light source B). The oxygen transmission was reduced to 0.005 cc/bottle·day·0.21 atm, showing good gas barrier properties. The measuring temperature was 23° C.

Example 6

A bottle was produced in the same manner as in Example 5 except for using a dry blend of 2% by weight of polyamide (A) and 98% by weight of polyethylene terephthalate. The oxygen transmission of the obtained bottle measured by shielding the bottle from light was 0.039 cc/bottle·day·0.21 atm. The obtained bottle was measured for the oxygen transmission in the same manner as in Example 5 except for irradiating light at 5000 lux (light source B) and changing the measuring temperature to 10° C. The oxygen transmission was reduced to 0.015 cc/bottle·day·0.21 atm, showing good gas barrier properties.

Example 7

A three-layered stretched film of nylon 6 layer/polyamide (A) layer/nylon 6 layer was produced by using poly-m-xylylene adipamide (MX Nylon S6007 manufactured by Mitsubishi Gas Chemical Company, Inc.) as polyamide (A). The nylon 6 layers were formed from UBE Nylon 1022B manufactured by UBE Industries, Ltd. The thickness of nylon 6 layer/polyamide layer/nylon 6 layer was 5 μm/5 μm/5 μm. The content of polyamide (A) in the multi-layered film was 35% by weight.

The oxygen transmission of the obtained multi-layered film measured by shielding the film from light was 8 cc/m$^2$·day·atm.

The obtained film was set to a jig which held the film with one surface being exposed to the surrounding atmosphere and the other surface being in contact with nitrogen stream and measured for the oxygen transmission under irradiation of light at 5000 lux (light source C). The oxygen transmission was reduced to 5 cc/m$^2$·day·atm, showing good gas barrier properties. The measuring temperature was 40° C.

Example 8

A film obtained in the same manner as in Example 7 was measured for the oxygen transmission in the same manner as in Example 6 except for irradiating light at 7000 lux (light source A) and changing the measuring temperature to 5° C. The oxygen transmission was reduced to 1 cc/m$^2$·day·atm, showing good gas barrier properties.

Example 9

The film obtained in Example 7 was measured for the oxygen transmission in the same manner as in Example 6 except for irradiating light at 1000 lux (light source B) and changing the measuring temperature to 50° C. The oxygen transmission was reduced to 6 cc/m$^2$·day·atm, showing good gas barrier properties.

Example 10

A single-layered bottle (27 g) was produced in the same manner as in Example 5 except for using 10 parts by weight of polyamide constituted by m-xylylenediamine and sebacic acid as polyamide (A). The average thickness of the barrel portion of the bottle was 330 μm. The oxygen transmission of the obtained single-layered bottle measured by shielding the bottle from light was 0.011 cc/bottle·day·0.21 atm.

The obtained bottle was measured for the oxygen transmission under irradiation of light at 4000 lux (light source A). The oxygen transmission was reduced to 0.0003 cc/bottle·day·0.21 atm, showing good gas barrier properties. The measuring temperature was 23° C.

Example 11

The bottle obtained in Example 10 was measured for the oxygen transmission in the same manner as in Example 10 except for irradiating light at 4000 lux (light source D). The oxygen transmission was reduced to 0.008 cc/bottle·day·0.21 atm, showing good gas barrier properties. The measuring temperature was 23° C.

TABLE 1

| Examples | Container | Illuminance (lux) | Light source | Temperature (° C.) |
| --- | --- | --- | --- | --- |
| 1 | MXD6 multi-layered bottle | 200 | A | 23 |
| 2 | MXD6 multi-layered bottle | 3000 | A | 23 |
| 3 | MXD6 multi-layered bottle | 5000 | B | 23 |
| 4 | MXD6 multi-layered bottle | 8000 | C | 23 |
| 5 | MXD6 blend bottle | 2000 | B | 35 |
| 6 | MXD6 blend bottle | 5000 | B | 10 |

TABLE 1-continued

| | | | | |
|---|---|---|---|---|
| 7 | N6/MXD6/N6 stretched film | 5000 | C | 40 |
| 8 | N6/MXD6/N6 stretched film | 7000 | A | 5 |
| 9 | N6/MXD6/N6 stretched film | 1000 | B | 50 |
| 10 | MXD10 single-layered bottle | 4000 | A | 23 |
| 11 | MXD10 single-layered bottle | 4000 | D | 23 |

| | Oxygen transmission* | | |
|---|---|---|---|
| Examples | under shielding | after 24 h of irradiation | Degree of improvement* |
| 1 | 0.012 | 0.008 | 66.7 |
| 2 | 0.012 | 0.005 | 41.7 |
| 3 | 0.012 | 0.004 | 33.3 |
| 4 | 0.012 | 0.003 | 25.0 |
| 5 | 0.035 | 0.005 | 14.3 |
| 6 | 0.039 | 0.015 | 38.5 |
| 7 | 8 | 5 | 62.5 |
| 8 | 8 | 1 | 12.5 |
| 9 | 8 | 6 | 75.0 |
| 10 | 0.011 | 0.0003 | 2.7 |
| 11 | 0.011 | 0.008 | 72.7 |

Oxygen transmission*: cc/bottle · day · 0.21 atm for bottles and cc/m$^2$ · day · atm for films.
Degree of improvement*: (oxygen transmission after 24 h of irradiation/oxygen transmission under shielding) × 100

As seen from examples, the oxygen transmission of the package including polyamide (A) having a specific unit composition is reduced by the irradiation of light as compared with that not irradiated with light, to improve the shelf stability of contents.

What is claimed is:

1. A storage method comprising:
   placing a product to be stored in a package, and
   storing the package containing the product under irradiation of light, thereby reducing an oxygen transmission of the package,
   at least part of the package comprising polyamide (A) which is obtained by polycondensation of a diamine component comprising 70 mol % or more of m-xylylenediamine and a dicarboxylic acid component comprising 70 mol % or more of α,ω-linear aliphatic dicarboxylic acid having 4 to 20 carbon atoms.

2. The storage method according to claim 1, wherein:
   the package comprises 0.1 to 100% by weight of polyamide (A),
   an average thickness of the package is 10 to 3000 μm, and
   the oxygen transmission of the package after irradiation of light having a wavelength of 10 to 1000 nm at an illuminance of 100 to 10000 lux for 24 h is 1 to 75% of the oxygen transmission before irradiation.

* * * * *